United States Patent [19]

Jobe et al.

[11] Patent Number: 4,792,232
[45] Date of Patent: Dec. 20, 1988

[54] METHOD AND APPARATUS FOR DETECTION OF UNDESIRABLE SURFACE DEFORMITIES

[75] Inventors: John D. Jobe; Allen E. Lepley, both of Houston, Tex.

[73] Assignee: Shell Oil Company, Houston, Tex.

[21] Appl. No.: 50,435

[22] Filed: May 18, 1987

[51] Int. Cl.$^4$ .......................... G01B 11/24; G06K 9/00
[52] U.S. Cl. ..................................... 356/394; 356/237; 382/22
[58] Field of Search ....................... 356/376, 394, 237; 382/22

[56] References Cited

U.S. PATENT DOCUMENTS

| | | | |
|---|---|---|---|
| 4,110,736 | 8/1978 | Kono | 382/22 |
| 4,525,858 | 6/1985 | Cline et al. | 356/376 |
| 4,598,420 | 7/1956 | Harvey | 382/22 |
| 4,629,319 | 12/1986 | Clarke et al. | 356/237 |

Primary Examiner—R. A. Rosenberger
Attorney, Agent, or Firm—Paul I. Douglas

[57] ABSTRACT

A method and apparatus for the detection of undesirable surface deformities is disclosed wherein a known (linear) light pattern is reflected off a fabricated part having a nominally smooth surface, the reflected light pattern subsequently being analyzed for distortions from the expected light pattern. The extent of the detected distortions may be quantified by the use of a computer having appropriate software, in order to identify and quantify unacceptable surface deformities.

7 Claims, 3 Drawing Sheets

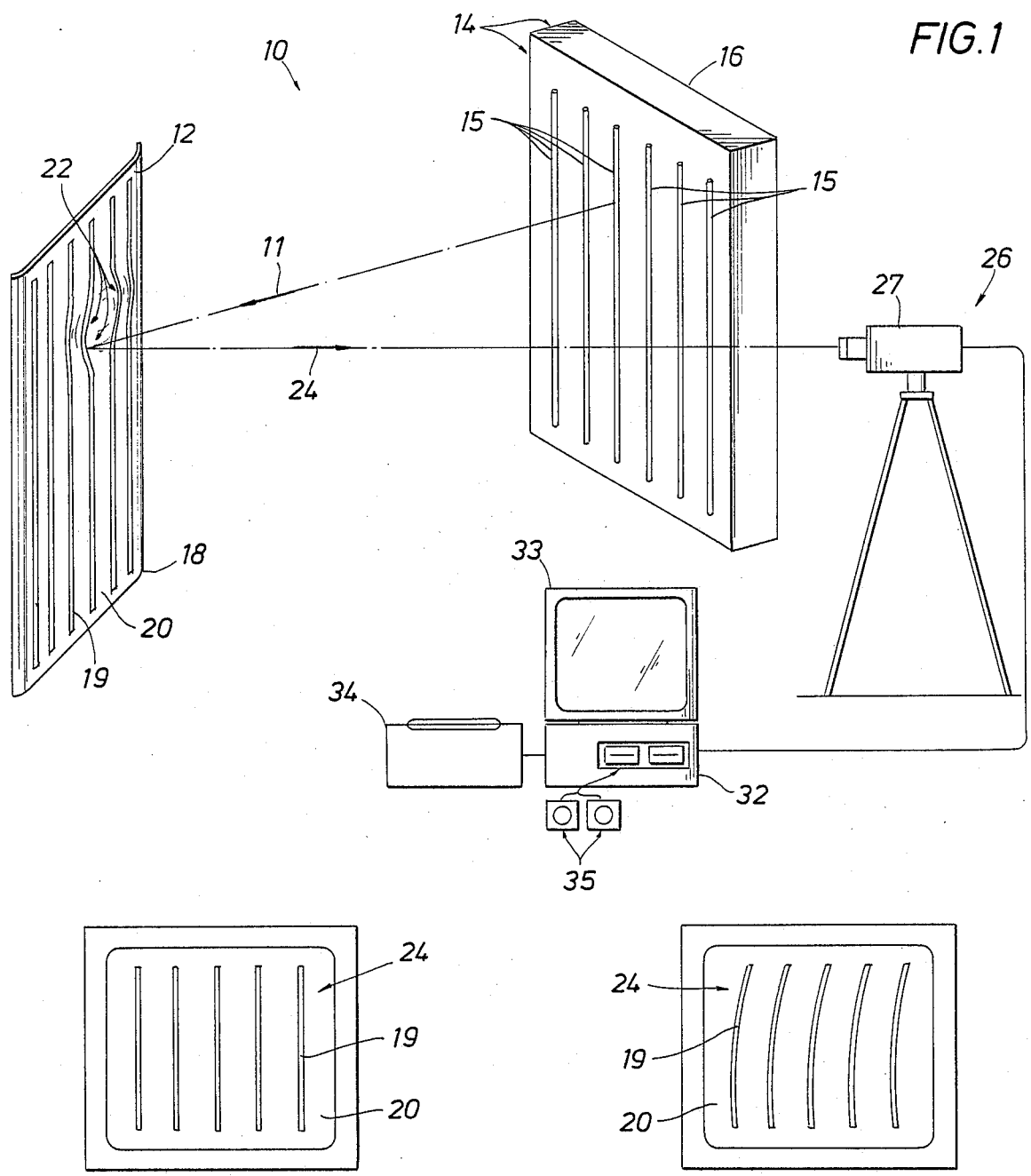

METHOD AND APPARATUS FOR DETECTION OF UNDESIRABLE SURFACE DEFORMITIES

BACKGROUND OF THE INVENTION

It has always been desirable to detect and, after detection, possibly correct the cause of any undesirable surface deformities that occur during the fabrication of any part designed to have a smooth surface. For example, in the case of the outer surface of an automobile, any visible surface deformities, such as waviness in the surface, or "orange peel" in the paint surface, that can be eliminated enhance the aesthetic and therefore the commercial value of the entire automobile. The competitive need to eliminate undesirable surface deformities in an automobile's outer surface becomes particularly important in the case of exterior automobile panels fabricated from fiber-reinforced plastics, i.e., fiberglass components, wherein the panel may already have a certain degree of waviness due to the fiberglass mold conditions, resin cure rates, or other conditions of the fabrication process that tend to generate a surface waviness.

One surface deformity measurement system has been developed by the Budd Company, Plastic Research and Development Center, Troy, Mich. The Budd system moves a height gauge across the surface to be studied, in order to attempt to measure the minute dimensions of surface deformities. This system is highly susceptible to background vibrations, can only measure one linear foot at a time, and is impractically slow in analyzing a large area. The system, due to these and other mechanical limitations, has not been placed in extensive use.

Another DiffractoSight system, offered for sale by Diffracto Inc., P.O. Box 36716, Grosse Point Woods, (Detroit) Mich. 48236, is also available wherein light is reflected off the surface of interest, the light then being viewed through special lens worn by the viewer. This system merely yields a visual representation of any surface deformities, with no means of reducing the viewed image of the distorted surface into any type of objective format for further study.

A system needed to be developed, therefore, that presents any undesirable deformities in a surface in a readily visible format, the system also being capable of reducing the observed deformities into an objective format for further analysis. Such a system should identify the location of any unacceptable surface deformities, and also perform an objective and quantitative analysis as to the extent and magnitude of these deformities.

SUMMARY OF THE INVENTION

The apparatus of the present invention analyzes the edges of a light pattern that has been reflected from a surface of interest to determine the existence of undesirable surface deformities, and visible surface coating deficiencies.

Shifts in the location of the edge from its expected reflected position indicate the existence of surface deformities, and the magnitude of the shifts can be measured in order to quantify the extent of the surface deformity.

More specifically, the method of the present invention comprises the following steps. A light pattern having at least one edge is projected onto the surface of interest from a light pattern source. The light pattern projected onto the surface is reflected from the surface and then received at a light pattern receiver. The reflected light pattern is converted by use of a computer and appropriate software into an array of pixels wherein each pixel has a value representative of the intensity of light received from a portion of the reflected light pattern. The value of each pixel is evaluated to define at least one edge of the reflected light pattern. And finally, the shape of the defined edge is analyzed to detect any undesirable surface deformities.

The analysis of the edge in a preferred embodiment comprises the steps of forming a fitted curve through the edge, measuring the amount of deviation of the edge from the fitted curve, and thereafter quantifying the amount of deviation of the edge from the fitted curve, to the amount of undesirable deformity in the surface.

The light pattern may be generated by use of a light source having linear edges, such as an assemblage of equally spaced and parallel flourescent light tubes, although slotted screens illuminated from the back and other linear sources are possible. It should be understood that surface deformities will become apparent at the high contrast edge(s) of the reflected light pattern, and not in the center width area of the reflected light pattern, so in the following discussion and description the term "edge" will be used extensively.

It is therefore an object of the invention to quantify the amount of undesirable surface deformities.

It is a further object of the present invention to describe a commercially viable surface deformity measurement system.

It is a further object of the invention, after the deformities in a particular surface have been quantified, to compare the quantitative measurement of the deformities in one surface to the quantitative measurement of deformities in another surface, so as to select one manufactured part above another for commercial use and sale, or to compare a production manufactured surface to a perfect or desired surface painstakingly created from any material that will yield the desired surface shape within desired tight tolerances.

It is a further object of the invention to create a system that will optically measure the surface finish of a relatively smooth surface.

It is a feature of the present invention to generate a known light pattern from a light source, reflect the light pattern from the surface of interest, receive the reflected light pattern by a camera, and, by the use of a computer and appropriate software, convert the reflected light pattern into at least one defined edge that may be analyzed so as to quantify the amount of deviation of the edge from a particular fitted curve mathematically generated through the elements of the edge, the fitted curve closely approximating the original edge of the original light pattern generated or projected from the light pattern source.

These and other features, objects and advantages of the present invention and become apparent from the following detailed description, wherein reference is made to the figures in the accompanying drawings.

BRIEF DESCRIPTION OF THE DRAWING

FIG. 1 is a schematic representation of the apparatus of the present invention, showing a light pattern source, fabrication part, camera, and computer display with printer.

FIG. 2 is a pictorial representation of an optimum reflected light pattern from a flat surface showing linear alternating light and dark areas.

FIG. 3 is a pictorial representation of an optimum reflected light pattern from a curvi-linear surface showing curvi-linear alternating light and dark areas.

FIG. 4 is a pictorial representation of a reflected light pattern from a curved surface, showing the linear distortion of the alternating dark and light areas due to the existence of a surface deformity on the curved surface.

DESCRIPTION OF THE PREFERRED EMBODIMENT

Figure 5:
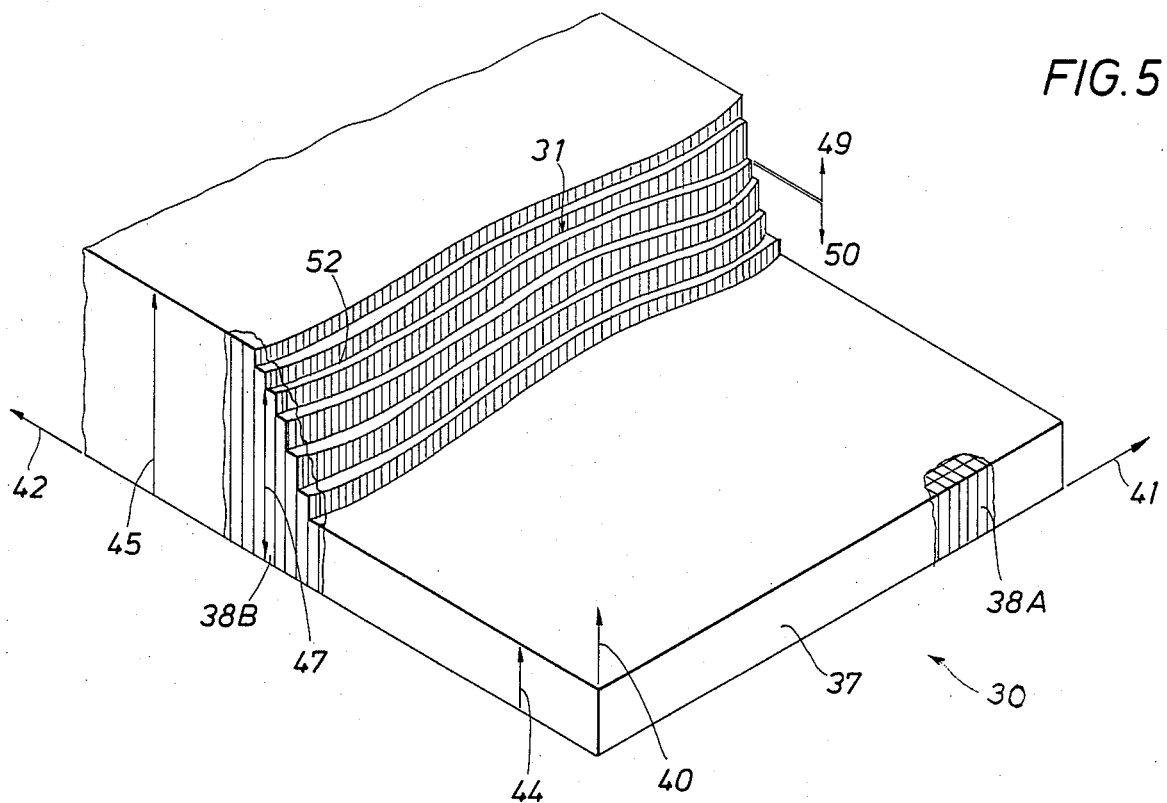
FIG. 5 is a pictorial representation showing a pixel array comprised of individual pixels, the values of each pixel plotted relative to a pixel value axis.

Referring now to FIG. 1 an undesirable surface deformity detection apparatus 10 is shown. In general, the apparatus 10 can be seen to comprise the following separate elements. Means for projecting a light pattern 11 onto surface 12, are provided, such as in a preferred embodiment comprising a light pattern source 14 having fluorescent light tubes 15 carried by a support frame 16. It should be well recognized that many other light pattern sources may be used that would project a light pattern having discernable edges upon part 18. Masking may be used over the edges of the fluourescent tubes 15 to block out the weaker lighted edge portions of the tubes 15 from the projected light pattern 11.

The light pattern 11 from the fluorescent light tubes 15, when projected on the surface 12 of fabricated part 18 causes the surface 12 to be visually divided into an alternating series of light areas 19 and dark areas 20. It should be well recognized that the contrast of the light intensity of the areas 19, 20 is related to the intensity of the projected light pattern 11, and the intensity of the background lighting projected on the fabricated part 18. To enhance the contrast between areas 19, 29, the surface 12 may be coated with a "high-lighting" oil, or other suitable liquid which will also increase the amount of light reflected from the surface 12.

The fabricated part 18 may comprise any part having a surface 12 wherein it is desired to monitor the surface 12 for the existence of any undesirable surface deformity 22. In a preferred embodiment, the fabricated part 18, may comprise for example a portion of the exterior shell of an automobile, the material of the part 18 formed for example from a molded sheet of fiber reinforced plastic known as sheet molding compound or "SMC".

The apparatus 10 can also be seen to include means for receiving a reflected light pattern 24 reflected from the part 18 such as by a light pattern receiver 26 comprising in a preferred embodiment a camera 27 located in the path of the reflected light pattern 24 and oriented so as to optically receive the reflected light pattern 24. The camera 27 in a preferred embodiment comprises a DAGE-MPI CC-68 instrumentation camera manufactured by DAGE-MPI Incorporated of Michigan City, Ind., having a 1,025/60 line resolution with a 2:1 interlace scan and equipped with a zoom lens.

It should be well recognized that other cameras 27 well known to the art may also be used to accomplish the teachings of the present invention.

The apparatus 10 also includes means for generating data 30 (FIG. 5) representative of the received reflected light pattern, means for evaluating the data 30 in order to define at least one edge 31 (FIG. 5) of the reflected light pattern; and means for analyzing the edge 31 to detect any undesirable surface deformities 22. These means in a preferred embodiment comprise a computer 32 and software compatible with the computer 32.

The computer 32 comprises in a preferred embodiment an IBM PC-AT model, having a SONY model GDM-1901-12 model CRT 33 display and a Honeywell VGR-5000 printer 34, model no. VGR-5H5HODTO as peripheral equipment. The software 35 comprises in a preferred embodiment an "Imagepro" software package with "Doctor Halo" graphic software, used in combination with "PC-EYE" Video Capture Software, the PC-EYE software available for purchase from Chorus Data Systems, Merrimack, N.H., the Image Pro software available from Media Cybernetics Incorporated.

The software 35 may be modified from its purchased format after study of the teachings of the present invention, to implement the teachings of the invention by those having ordinary skill in the art.

Referring now to FIG. 2 a reflected light pattern 24 from a substantially flat surface 12 is shown wherein the light area 19 is formed in a relatively linear straight manner relative to the dark area 20. This is a desirable reflected light pattern 24 from a substantially flat surface 12.

Referring now to FIG. 3, a reflected light pattern 24 is shown from a smoothly curved surface 12 wherein the light area 19 is defined in a relatively curvilinear manner relative to the dark area 20. Such a display forms a convenient man-machine interface for qualitively and subjectively inspecting the surfaces of manufactured parts.

Referring now to FIG. 4 a reflected light pattern 24 is shown from a smoothly curved surface 12 having a surface deformity 22A wherein at least one of the light areas 19 is no longer defined in a substantially uninterrupted curvilinear manner relative to the dark area 20. In other words, the projected view of the fluorescent light tubes 15 (FIG. 1) has become distorted due to the existence of the undesirable surface deformity 22A.

Figure 6:
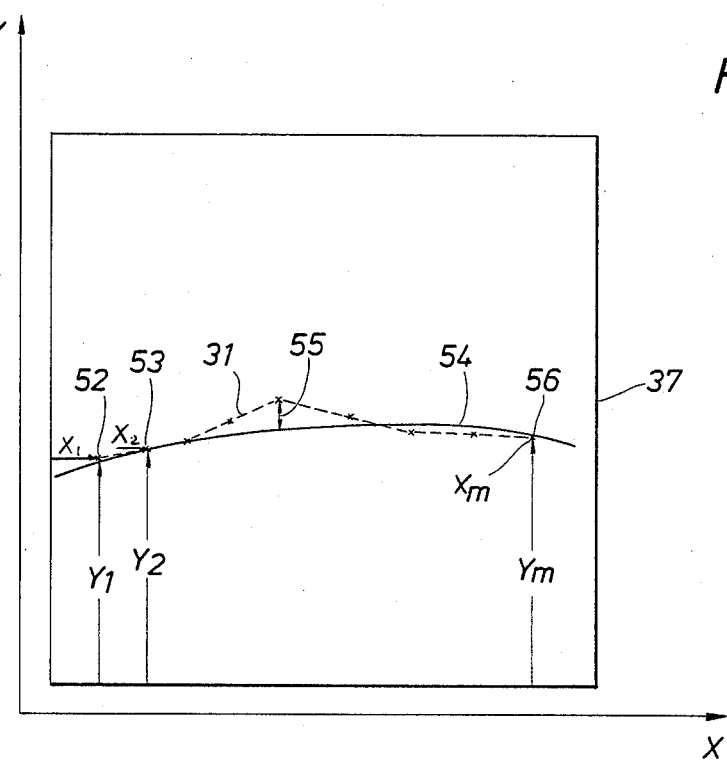
FIG. 6 is a graphical representation showing a reflected light pattern edge, a fitted curve generated through said edge, and a deviation measured from the fitted curve to the reflected light pattern edge.

Referring now to FIGS. 5 and 6, the method of detecting undesirable deformities in a surface may now be explained in further detail. As mentioned earlier the light pattern is projected onto a surface from a light pattern source, and a light pattern receiver thereafter receives a reflected light pattern from the surface of interest. Thereafter, reflected light pattern data 30 is generated by the computer software. In the software of the present invention, the reflected light pattern is converted into an array of pixels 37 wherein each pixel, (38A, 38B for example), has a value representing the intensity of light received from a particular portion of the reflected light pattern.

The values of the pixels 38 in the array 30 are then evaluated to define at least one reflected light pattern edge 31 within the pixel array 37. The shape of the edge 31, having the functional relationship $y = f(x)$, is then analyzed to detect the presence of any undesirable surface deformities in the surface of interest.

The pixel array 37 shown in FIG. 5 can be seen to have a pixel value axis 40, an x-axis 41, and a y-axis 42.

The software assigns a pixel value of 0 for a received light intensity of "pure black", and a pixel value of 255 for the light intensity received from a "pure white" areas. As shown therefore the dark area pixel value 44 will typically be much less than the light area pixel value 45. The dark area pixel value 44 represents the dark area 20 shown in FIG. 4, for example, whereas the light area pixel value 45 represents the light area 19. It should be well understood that pixel scales having other ranges may be used to accomplish the same result, such as a scale of 0–63 vs. the 0–255 scale used in the present invention.

As shown in FIG. 5, the value of the pixels varies in a fairly linear manner between the dark area and the light area. In other words, a "gray area" exists between the dark and light areas. Due to the numerous discrete values of each piexel 38 it therefore becomes necessary to define the edge 31 with a degree of confidence, recognizing that the real life values of each discrete pixel are not so neatly organized as those shown in FIG. 5.

By the method of the present invention, the edge 31 is defined by segregating pixels having a selected pixel value 47 or a value greater than the selected pixel value 47 into a first group 49 of pixels, and thereafter segregating pixels 38 having less than the selected value 47 into a second group 50 of pixels. The edge 31 of the reflected light pattern is thereafter defined at the boundary of the first group 49 and the second group 50 of pixels. It has been noted that the width of the light/dark intersection is only two or three pixels on a 1024 wide pixel screen.

It is well understood that a mathematical "averaging" process may be used to blend together the values of adjacent pixels having widely disparate values, in order to create the relatively smooth gray transition area as shown in FIG. 5.

It should be well recognized that many other techniques may be used to define an edge 31 within the pixel array 37 representative of the edge between the light area 19 and dark area 20 shown in FIG. 4. Mathematical filters, called "spatial filters", can be used to adjust the value of each pixel in a field as a function of the values of the surrounding pixels. Such filtering techniques can be used to enhance the sharpness of the edge's demarkation.

The coordinates $X_1$, $Y_1$ 52 of each pixel along the reflected light pattern edge 31 may then be analyzed in the preferred embodiment to detect undesirable surface deformities, in the following manner.

A fitted curve 54, (FIG. 6), may be formed through the edge 31 coordinates $X_1$, $Y_1$, 52; $X_2$, $Y_2$, 53; . . . $X_m$, $Y_m$, 56 of the rjeflected light pattern by finding coefficients $a_0$, $a_1$, $a_2$, . . . $a_m$, of the equation $$Y = a_0 + a_1 X + \ldots + a_i X^i + \ldots + a_m X^m. \quad (1)$$

It is well recognized that many mathematical techniques, such as the use of matrix transforms, are available for determining optimum values for each of the coefficients $a_i$ in the above equation. In a preferred embodiment the well known Least Squares Method is used. This technique generates the curve which will minimize the sum of the squares of the values of all the deviations 55 from the generated curve defined by the above equation. The technique for calculating the values of these coefficients minimizes the value of sum S in the equation $$S = \sum_{i=i}^{N} (Y_i - Y_i')^2 \quad (2)$$

where $Y_i'$ is the computed value of each point corresponding to the measured data point $Y_i$. To make the required calculations it is first necessary to select the form of equation to be used. In this particular case a polynomial of M degree having m+1 terms will be described, however, it is recognized that a logarithmic or other series of terms could be substituted. To generate equations whose solution will meet the above minimizing criteria partial derivatives of S are taken in respect to each of the coefficients of the selected polynomial. The resulting group of m+1 normal equations, $$\Sigma Y_i = a_0 n + a_1 \Sigma X_i + a_2 \Sigma X_i^2 + \ldots + a_m \Sigma X_i^m, \quad (3)$$

$$\Sigma X_i Y_i = a_0 \Sigma X_i + a_1 \Sigma X_i^2 + a_2 \Sigma X_i^3 + \ldots + a_m \Sigma X_i^{m+1}, \quad (4)$$

$$\Sigma X_i^m Y_i = a_0 \Sigma X_i^m + a_1 \Sigma X_i^{m+1} + a_2 \Sigma X_i^{m+2} + \ldots + a_m \Sigma X_i^{2m}. \quad (5)$$

can be solved for values of $a_0$, $a_i$, . . . $a_m$ by the conventional Gauss elimination technique which succussively determines the value of each coefficient. Then the original equation can be solved for values of $Y_i$ in respect to its related values of $X_i$. It is to be noted that the original m+1 number of terms used to define the generated equation does not restrict the number of $X_i$, $Y_i$ points which can be computed and compared with their related points on the original reflected edge. In practice the number of terms selected depends upon the intended use of the curve, and more than one equation may be computed to satisfy diverse requirements.

A large number iof terms may be required when the intent of the calculation is to define minute discrepancies in the reflected edge such as those caused by improperly applied paint or other surface coatings. This small scale "roughness", often known as "orange peel", is defined by data variations only a few pixels wide and a few high. The resulting calculated curve follows the contour of the reflected light edge including those deviations from the basic surface curvature caused by any relatively large, shallow deformities in the surface. Conversely, when such large deformities themselves are being investigated, only a limited number of terms is used. For example, if the reflected image from a linear source arranged perpendicularly to the axis of symmetry of a surface displaying bilateral symmetry is captured, then a second order polynomial curve, i.e., a parabola, may be the best choice for the resulting calculated curve.

Figure 7:
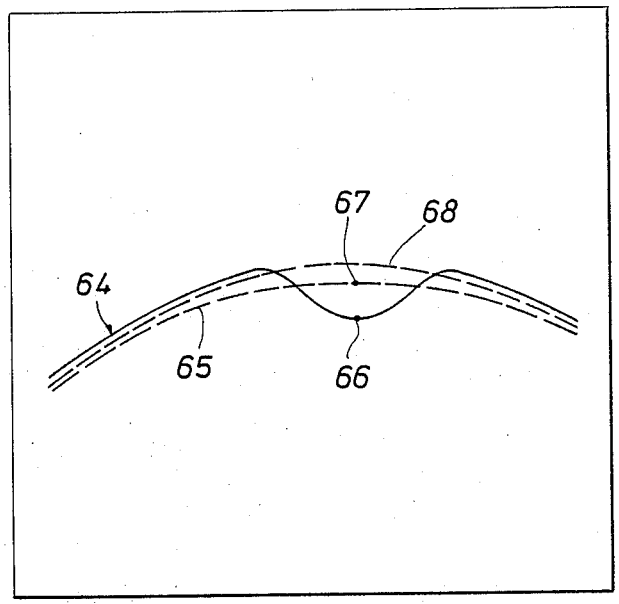
FIG. 7 is a graphical representation showing an edge, and two fitted curves generated through said edge.

The deviations from the best fit curve caused by a dent or depression in the original smooth surface may imply that there are bumps or raised portions of the surface relative to the ideal surface. Therefore, in some cases, the best fit curve needs to be adjusted either toward higher or lower values of the Y variable. In this latter case, even this use of a limited number of terms will not totally eliminate the effect of such deformities on the resulting calculated curve 65 of edge 64 as shown in FIG. 7. To reduce this effect various known mathematical techniques are available. One preferred method is to revalue all point(s) 66 which are found to be below the generated curve 65 so that they now lie on this generated curve as point(s) 67. Next, a new best fit curve 68 is generated using the original measured data except where these modified points have been substituted. This will generate a best fit curve 68 having a minimum of distortion caused by the discrepancies. It is recognized that a second and third repetition of this process may provide additional improvement. The final generated curve can then be effectively used for comparison with the original data.

Once a base curve has been defined by its $a_i$ constants, the amount of deviation 55 of the edge 31 from the fitted curve can be calculated at each selected $X_i$, $Y_i$ location. It should be well recognized that an analysis of these deviations can then be used to establish the magnitude of any discrepancies and/or deformities in the surface being analyzed and that this analysis can be used to establish the acceptability of such defects in respect to the accepted aesthetic norm.

Different approaches can be used in the presentation of the generated surface acceptability data. Each is suitable for use with either the "orange peel" or the shallow deformity data. Two preferred approaches are described here, however, it is recognized that many variations are available to meet each particular user's needs.

One preferred technique is to provide a single quantitative numerical evaluation of the product's surface acceptability. One way to obtain such a representative value is to sum the squares of all the individual point discrepancies using the previously calculated constants $a_i$.

$$\Sigma d_i^2 = \Sigma Y_i^2 - (a_0 \Sigma Y_i + a_1 \Sigma X_i Y_i + \ldots + a_m \Sigma X_i^m Y_i), \quad (6)$$

wherein $\Sigma d_i^2$ equals the summation of the amount of net deviation of the edge 31 from the fitted curve 54. The relative accetability of this resulting numerical value can then be established by comparing it with values obtained from tests of product components of known acceptability levels. It is recognized that a relationship can also be established between this number and actual measurements of the bumps or deressions in surfaces which have been measured using devices such as surface profilometers and micrometers. Thus, if shallow or broad depressions are being fitted by curve fit routines that closely follow these relatively large deformities, then $\Sigma d_i^2$ will be a quantitative measure of the small or "orange peel" type of deviation. Otherwise, $\Sigma d_i^2$ will represent the major shallow or broad deviations.

Figure 8:
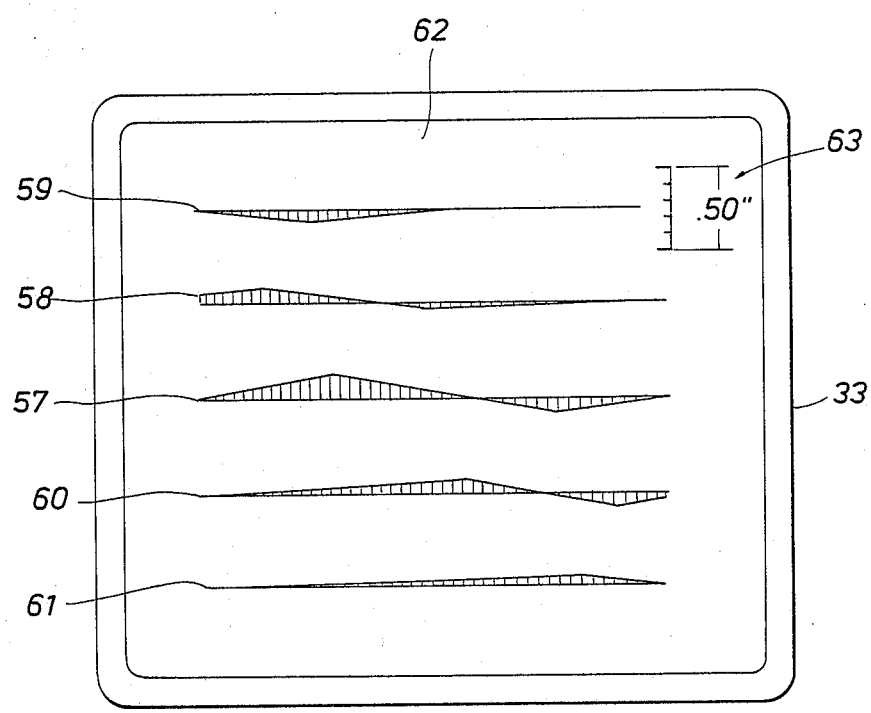
FIG. 8 is a pictorial representation of a deviation contour map.

A second preferred technique is to provide the user with a visual presentation of the generated discrepancy data. As shown in FIG. 8, it should be well understood that the computer may be programmed to cause the pixels that are located between the fitted curve 54 and the edge 31 to be represented graphically on the CRT display 33 as a deviation line 57. Furthermore, other pixels located between other fitted curves and edges may also be graphically displayed as deviation lines 58, 59, 60, and 61, so that a deviation contour map 62 may be presented for the entire part 18. Separate presentations are used to clearly present both the "orange peel" discrepancies and the large, shallow deformities.

Calibration data generated by prior use of a surface profilometer or micrometer may also be referenced by the computer in order to present a deviation scale 63, wherein scale 63 may be compared against deviation lines 57-61 to determine the dimensions of undesirable surface deformities.

It should be well recognized that many other mathematical methods may be used to accomplish the same analytical evaluation, such as for example use of the Fourier Series to form a fitted curve through the edge 31. Additionally, it should be recognized that separate discrete fitted curves may be generated along the length of a single edge.

The software loaded into the computer, in the preferred embodiment of the present invention, performs the above described operations such as conversion of the reflected light pattern into an array of pixels, evaluation of the pixel values in order to define the edge, and analysis of the edge to detect the existence of undesirable surface deformities. It is well recognized that many other software combinations, and/or combinations of computers may be used to perform these operations.

Many other variations and modifications may be made in the apparatus and techniques hereinbefore described, both by those having experience in this technology without departing from the concept of the present invention. Accordingly, it should be clearly understood that the apparatus and methods depicted in the accompanying drawings and referred to in the foregoing description are illustrative only and are not intended as limitations on the scope of the invention.

What is claimed is:

1. A method of detecting undesirable deformities in a surface, comprising the steps of:
   projecting a light pattern having at least one edge onto said surface from a light pattern source;
   receiving at a light pattern receiver a reflected light pattern from said surface;
   converting said reflected light pattern into an array of pixels, each pixel havin a value representing the intensity of light received from a portion of the reflected light pattern;
   evaluating the value of said pixels to define at least one edge of said reflected light pattern;
   forming a fitted curve through said at least one edge of said reflected light pattern;
   measuring the amount of deviation of said at least one edge from said fitted curve; and
   quantifying the amount of deviation of said at least one edge from said fitted curve, to the amount of undesirable deformity in said surface.

2. The method of claim 1 wherein the step of forming a fitted curve through said at least one edge of said reflected light pattern further includes the step of:
   dividing said at least one edge along the length of said edge thereof into separate discrete edges, and forming discrete curves through each of said separate discrete edges.

3. The method of claim 1 wherein the step of forming a fitted curve through said at least one edge further includes the step of:
   finding coefficients $a_0, a_1, a_2, \ldots a_m$, of the equation;

$$Y = a_0 + a_1 X + \ldots + a_m X^m.$$

4. The method of claim 1 wherein the step of measuring the amount of deviation of said at least one edge from said fitted curve further includes the steps of:
   finding coefficients $a_0, a_1, a_2, \ldots a_m$, of the equation:

$$Y = a_0 + a_1 X + \ldots + a_m X^m,$$

using the Normal Equations of the Least Squares method of curve formation; and
   substituting said coefficients into the equation:

$$\Sigma d_i^{2A} = \Sigma Y_i^2 - (a_o \Sigma Y_i + a_1 \Sigma X_i Y_i + \ldots + a_m \Sigma X_i^m Y_i),$$

wherein $\Sigma d_i^2$ = the amount of deviation of the edge of the reflected light pattern from the fitted curve.

5. A method of detecting undesirable deformities in a surface, comprising the steps of:
projecting a light pattern having at least one edge onto said surface from a light pattern source;
receiving at a light pattern receiver a reflected light pattern from said surface;
converting said reflected light pattern into an array of pixels, each pixel having a value representing the intensity of light received from a portion of the reflected light pattern;
segregating pixels having a selected value and pixels having a value greater than said selected value into a first group;
segretating pixels having less than said selected value into a second group;
defining at least one edge of said reflected light pattern at the boundary of said first group of pixels and said second group of pixels;
forming a fitted curve through said at least one edge of said reflected light pattern by
finding coefficients $a_0, a_1, a_2, \ldots a_m$, of the equation:

$$Y = a_o + a_1 X + \ldots + a_m X^m,$$

using the Normal Equations of the Least Squares method of curve formation;
measuring the amount of deviation of sid at least one edge from said fitted curve by
finding coefficients $a_0, a_1, a_2, \ldots a_m$, of the equation:

$$Y = a_o + a_1 X + \ldots + a_m X^m,$$

using the Normal Equations of the Least Squares method of curve formation; and substituting said coefficients into the equation:

$$\Sigma d_i^2 = \Sigma Y_i^2 - (a_o \Sigma Y_i + a_1 \Sigma X_i Y_i + \ldots + a_m \Sigma X_i^m Y_i),$$

wherein $\Sigma d_i^2$ = the amount of deviation of the edge of the reflected light pattern from the fitted curve; and
quantifying the amount of deviation of said at least one edge from said fitted curve, to the amount of undesirable deformity in said surface.

6. An apparatus for detecting undesirable deformities in a surface, said apparatus comprising:
a light pattern source having at least one flourescent light carried by a support frame, said light pattern source generating a light pattern directed at said surface;
at least one camera located in the path of reflection of said light pattern, said at least one camera located so as to receive said reflected light pattern;
at least one computer, and software compatible with said at least one computer, said software being capable of; converting said reflected light pattern into an array of pixels;
evaluating the value of said pixels to define at least one edge of said reflected light pattern, by segregating pixels having a selected value and pixels having a value greater than said selected value into a first group;
segregating pixels having less than said selected value into a second group, and defining at least one edge of said reflected light pattern at the boundary of said first group of pixels and said second group of pixels;
analyzing said at least one edge of said reflected light pattern to detect sid undesirable surface deformities by forming a fitted curve through said at least one edge of said reflected light pattern;
measuring the amount of deviation of said at least one edge from said fitted curve; and
quantifying the amount of deviation of said at least one edge from said fitted curve, to the amount of undesirable deformity in said surface.

7. An apparatus for detecting undesirable deformities in a surface, said apparatus comprising:
means for projecting a light pattern onto said surface;
means for receiving a reflected light pattern from said surface;
means for generating data representative of the received reflected light pattern;
means for evaluating said reflected light pattern data in order to define at least one edge of said reflected light pattern;
means for forming a fitted curve through said at least one edge of said reflected light pattern;
means for measuring the amount of deviation of said at least one edge from said fitted curve; and
means for quantifying the amount of deviation of said at least one edge from said fitted curve, to the amount of undesirable deformity in said surface.

* * * * *